Patented Dec. 27, 1932

1,892,650

UNITED STATES PATENT OFFICE

STEWART P. COLEMAN AND JOHN A. COLEMAN, OF HOUSTON, TEXAS, ASSIGNORS TO STANDARD OIL DEVELOPMENT COMPANY, A CORPORATION OF DELAWARE

WATER-SOLUBLE SLUDGE ACID AND METHOD OF PREPARING THE SAME

No Drawing. Substitute for application Serial No. 72,052, filed November 28, 1925. This application filed January 13, 1932. Serial No. 586,458.

This invention relates to improvements in the preparation of water-soluble sludge acids, such as may be derived from sludges obtained by the sulfuric acid treatment of petroleum oils.

As is well known, sludge acid compounds of petroleum hydrocarbons exist in oil-soluble and water-soluble form. The latter have been isolated heretofore by successively washing the sludge with a petroleum distillate and water, neutralizing sludge acids and residual sulfuric acid with sodium carbonate, extracting residual oil with naphtha, and treating the neutralized sludge with sulfuric acid, whereby the sludge acid salts formed in the neutralization are decomposed with liberation of the free sludge acids.

In accordance with the present invention, this procedure is simplified and improved by the elimination of the sludge acid neutralizing step, and in other respects. There is obtained a new and useful type of sludge acids, having characteristics different from those of sludge acids formed in the treatment of oils with fuming sulfuric acid. No salts of the sludge acids are formed in substantial amounts at any stage of our process; the salts may of course be subsequently prepared, if desired.

In a preferred form of the invention a lubricating stock is dried by treatment with 66° Bé. sulfuric acid. One or more treatments with the acid may be given, as may be required. The dried oil is then reacted upon in an agitator with 98% sulfuric acid for from 30 to 45 minutes. From 15 to 20 lbs. of acid per 42 gallon barrel of oil is usually required. About 0.5% to 2.0% by volume of water is then added and the mixture is agitated, as by blowing, until sufficient coagulation has taken place to permit proper settling. After settling, the sludge is drawn off, preferably into brick-lined kettles of from 600 to 700 barrels capacity. The acid-treated oil is neutralized if necessary for the preparation of the finished lubricant.

The sludge is washed with water to remove sulfuric acid until the acid wash water has a density of approximately 15° to 20° Bé. The amount of water used should not generally be greater than that which will form a solution of the density specified. The sludge will not float in lighter solutions, because its density is increased by the sulfuric acid that it persistently retains in spite of the washing with water. It is desirable that the sludge should float, since this makes it possible to draw off the weak sulfuric acid solution conveniently from the bottom of the receptacle.

We have found that the addition of a small amount of alkali at this step, to partially neutralize the retained sulfuric acid, so reduces the gravity of the sludge that it will float in a much weaker acid solution (3°–4° Bé.). It is therefore possible to continue the washing and remove most of the acid, without sacrificing the advantages of a floating sludge. While the method described of withdrawing the washed out acid is generally most convenient, other methods of removal may be adopted, especially if a non-floating sludge is formed.

Sulfuric acid has a decided retarding effect on the solubility of the sludge acids, and after the greater portion of the sulfuric acid has been washed out the sludge acids may be readily dissolved in water. When the acid wash water reaches a density of about 3° to 4° Bé., the washing may be considered complete. An additional volume of water is then added and the sludge acids readily dissolve in the weak acid solution as thus diluted. No more water should be added than is necessary completely to dissolve the sludge acids, since excess of water at this point will necessitate the use of an unnecessary amount of acid in the salting out step subsequently described. The mixture of water and sludge is heated and allowed to settle, and the water layer containing the dissolved sludge acids is then drawn off. It may contain about 20% by weight of sludge acids calculated on the dry basis. The various washing steps are preferably conducted at about 175° to 225° F.

This solution of sludge acids is conveyed to a lead-lined agitator and sulfuric acid is added. 66° Bé. acid, or the 15° to 20° Bé. acid wash water referred to above, may be used. When the free sulfuric acid concentration is from 7 to 8%, the sludge acids separate out and the weak sulfuric acid is drawn off. The separated sludge acids are then ready for packing or use. In some cases the sulfonic acids may be reprecipitated or salted out one or more times, preferably with sulfuric acid, to remove any inorganic impurities that may be present. The dry acids when pure are solid at ordinary temperatures. They are soluble in water and in numerous organic solvents. The alkaline earth metal salts of the sludge acids produced according to this invention are for the most part insoluble in water. The ease with which our acids are salted out by inorganic acids, such as sulfuric acid, and by inorganic salts, for example sodium chlorid, distinguishes them from the sludge acids formed by the fuming acid treatment of hydrocarbon oils.

One of the most important uses of the sludge acids is in the breaking of emulsions of petroleum oils and water. Sludge acids prepared according to the present method are particularly suitable for this purpose.

Various changes may be made in the specific procedure described, within the scope of the appended claims, in which it is our intention to claim all novelty inherent in the invention as broadly as the prior art permits This is a substitute for application, Serial No. 72,052, filed November 28, 1925 and allowed September 2, 1930.

We claim:

1. A process for preparing water-soluble sludge acids from sludge obtained in the sulphuric acid treatment of petroleum oils and containing residual free sulphuric acid, comprising washing the sludge with water, adding to the sludge a small quantity of alkali insufficient to neutralize the sulphuric acid retained by the sludge and washing the sludge with water.

2. A process for preparing water-soluble sludge acids from sludge obtained by the sulphuric acid treatment of petroleum oils and containing residual sulphuric acid, comprising, washing the sludge with water, settling and drawing off the aqueous layer, adding alkali insufficient to neutralize the sulphuric acid retained by the sludge, washing again with water, settling and discarding the aqueous layer, and separating the sludge acids from the sludge.

3. A process for preparing water-soluble sludge acids from the sludge obtained by the sulphuric acid treatment of hydrocarbon oils, comprising washing the sludge with water, settling and withdrawing the aqueous layer, maintaining the density of the sludge less than that of the aqueous layer by adding a small quantity of alkali to the sludge, again washing with water, settling and discarding the aqueous layer.

4. Process for preparing water soluble sludge acids from sludges obtained in the sulphuric acid treatment of petroleum oils and containing residual free sulphuric acid, comprising washing the sludge with water until the acid wash water has a density of approximately 15 to 20° Bé., settling and drawing off the aqueous sulphuric acid layer, adding alkali sufficient to combine with only a part of the sulphuric acid still retained by the sludge, again washing with water until the acid wash water has a density of about 3 to 4° Bé., settling and drawing off the aqueous layer and dissolving the sludge acids in a further quantity of water.

STEWART P. COLEMAN.
JOHN A. COLEMAN.